(12) United States Patent
Lin et al.

(10) Patent No.: US 12,225,543 B2
(45) Date of Patent: Feb. 11, 2025

(54) METHOD FOR INFORMATION PROCESSING, TERMINAL DEVICE, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventors: Yanan Lin, Dongguan (CN); Jing Xu, Dongguan (CN); Zuomin Wu, Dongguan (CN)

(73) Assignee: GUANGDONG OPPO MOBILE TELECOMMUNICATIONS CORP, LTD., Guangdong (CN)

( * ) Notice: Subject to any disclaimer, the term of this patent is extended or adjusted under 35 U.S.C. 154(b) by 365 days.

(21) Appl. No.: 17/816,663

(22) Filed: Aug. 1, 2022

(65) Prior Publication Data
US 2022/0369356 A1 Nov. 17, 2022

Related U.S. Application Data

(63) Continuation of application No. PCT/CN2020/074558, filed on Feb. 7, 2020.

(51) Int. Cl.
*H04L 5/00* (2006.01)
*H04L 1/1829* (2023.01)
*H04W 72/1273* (2023.01)
*H04W 72/23* (2023.01)
*H04W 72/566* (2023.01)

(52) U.S. Cl.
CPC ............ *H04W 72/23* (2023.01); *H04L 5/0053* (2013.01); *H04W 72/1273* (2013.01); *H04W 72/569* (2023.01)

(58) Field of Classification Search
CPC ............ H04W 72/23; H04W 72/1273; H04W 72/569; H04L 5/0053; H04L 5/0055
See application file for complete search history.

(56) References Cited

U.S. PATENT DOCUMENTS 11,563,545 B2 * 1/2023 Li ........................... H04L 5/001
2017/0273056 A1 * 9/2017 Papasakellariou .... H04L 1/1861
(Continued)

FOREIGN PATENT DOCUMENTS

CN 101986591 A 3/2011
CN 103973413 A 8/2014
(Continued)

OTHER PUBLICATIONS

3GPP TSG-RAN WG1 Meeting#89, R1-1708742 Title:Initial design consideration fro DM-RS overhead reduction (Year: 2017).*
(Continued)

*Primary Examiner* — Faruk Hamza
*Assistant Examiner* — Abusayeed M Haque
(74) *Attorney, Agent, or Firm* — PERKINS COIE LLP

(57) ABSTRACT

A method for information processing is provided. The method is executed by a terminal device and includes determining first information corresponding to first downlink control information (DCI), where the first information is used for transmitting acknowledgement/negative acknowledgement (ACK/NACK) information in groups, and a physical channel corresponding to the first DCI is associated with priority information.

15 Claims, 2 Drawing Sheets

(56) References Cited

U.S. PATENT DOCUMENTS

| | | | | |
|---|---|---|---|---|
| 2017/0331577 | A1* | 11/2017 | Parkvall | H04W 8/18 |
| 2019/0103943 | A1 | 4/2019 | Wang et al. | |
| 2019/0223164 | A1 | 7/2019 | He et al. | |
| 2019/0230685 | A1 | 7/2019 | Park et al. | |
| 2019/0363843 | A1* | 11/2019 | Gordaychik | H04W 72/044 |
| 2020/0153541 | A1* | 5/2020 | Faxer | H04W 24/10 |
| 2020/0344012 | A1* | 10/2020 | Karaki | H04L 1/1861 |

FOREIGN PATENT DOCUMENTS

| | | |
|---|---|---|
| CN | 104811284 A | 7/2015 |
| CN | 106455113 A | 2/2017 |
| CN | 107294667 A | 10/2017 |
| CN | 109217996 A | 1/2019 |
| CN | 109417444 A | 3/2019 |
| CN | 109586877 A | 4/2019 |
| CN | 109639398 A | 4/2019 |
| CN | 109804584 A | 5/2019 |
| CN | 109842869 A | 6/2019 |
| CN | 110493879 A | 11/2019 |
| CN | 110495123 A | 11/2019 |
| CN | 110535572 A | 12/2019 |
| CN | 110536464 A | 12/2019 |
| CN | 110546903 A | 12/2019 |
| CN | 110611555 A | 12/2019 |
| CN | 110661594 A | 1/2020 |
| CN | 110708146 A | 1/2020 |
| CN | 115023914 A | 9/2022 |
| JP | 2019530382 A | 10/2019 |
| WO | 2018018620 A1 | 2/2018 |

OTHER PUBLICATIONS

3GPP TSG-RAN WG1 Meeting#87, R1-1611536 Title:DCI fo r10 HARQ Process operation in feMTC (Year: 2016).*

Notice of Reasons for Refusal issued in corresponding JP application No. 2022-547166 dated Feb. 16, 2024. 12 pages with English translation.

Qualcomm Incorporated, "Priority handling for Sidelink Direct Communication", 3GPP TSG-RAN WG2 Meeting #91, R2-153729, Aug. 24-28, 2015. Retrieved from: https://www.3gpp.org/ftp/TSG_RAN/WG2_RL2/TSGR2_91/Docs.

Huawei, "Feature lead summary#3 of HARQ enhancements for NR-U", 3GPP TSG RAN WG1 Meeting #99, R1-1913561, Nov. 18-22, 2019. Retrieved from: https://www.3gpp.org/ftp/tsg_ran/wg1_rL1/TSGR1_99/Docs/.

OPPO, "Summary#3 on UCI enhancements for URLLC", 3GPP TSG RAN WG1 #99, R1-1913535, Nov. 18-22, 2019. Retrieved from: https://www.3gpp.org/ftp/tsg_ran/wg1_rL1/TSGR1_99/Docs/.

WIPO, International Search Report and Written Opinion for International Application No. PCT/CN2020/074558, Oct. 28, 2020.

First examination report issued in corresponding IN application No. 202217044369 dated Sep. 26, 2023. 6 pages.

Examination report issued in corresponding European application No. 20917780.7 dated Aug. 14, 2023. 7 pages.

Nokia, Nokia Siemens Networks "Proposals on TDD ACK/NAK feedback in Rel-10", TSG-RAN WG1 Meeting #63 R1-106503, Nov. 15-19, 2010. 4 pages.

Fa Zhang "Research and Implementation of Medium Access Control in 5G System for the Super Base Station", Master's degree thesis of Chongqing University of Posts and Telecommunications, Jan. 15, 2020. 91 pages with English translation of abstract.

The first office action issued in corresponding CN application No. 202211474529.8 dated Apr. 27, 2024. 14 pages with English translation.

M. Pavan Reddy et al., "Downlink Control Channel Scheduling for 3GPP Narrowband-IoT" 2018 IEEE 29th Annual International Symposium on Personal, Indoor and Mobile Radio Communications (PIMRC), Dec. 20, 2018. 7 pages.

Notice of allowance issued in corresponding CN application No. 202211474529.8 dated Jun. 14, 2024. 6 pages with English translation.

Qualcomm Incorporated "Summary of NR-U agreements till RAN1 #99" 3GPP TSG RAN WG1 Meeting #99 R1-1913599, Nov. 18-22, 2019. 40 pages.

The extended European search report issued in corresponding European application No. 20917780.7 dated Nov. 17, 2022. 10 pages.

* cited by examiner

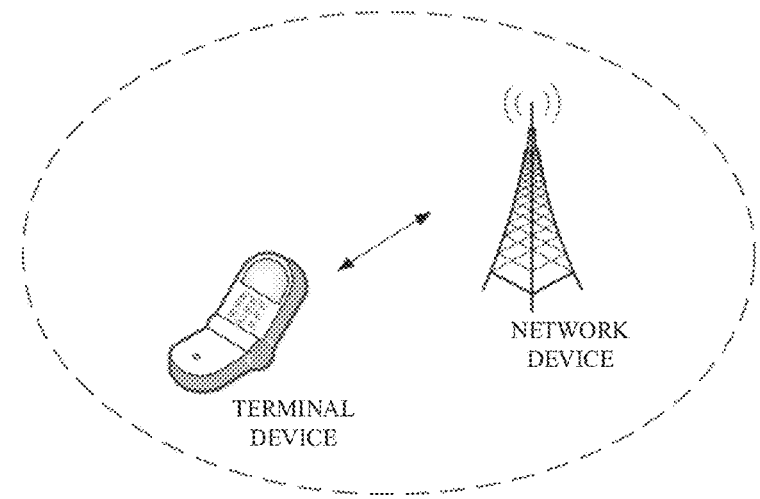
FIG. 1
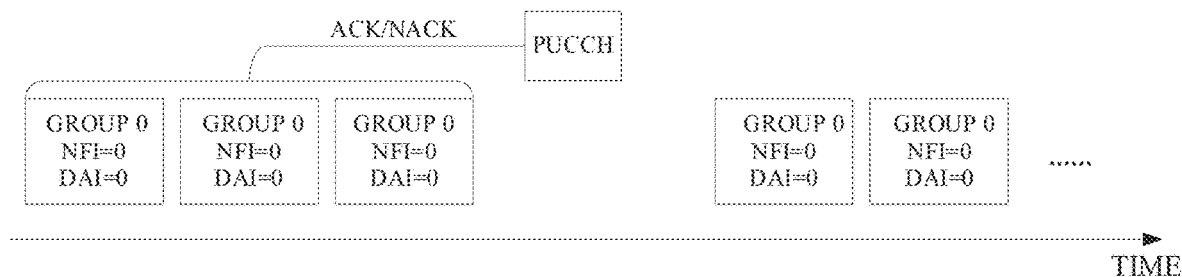
FIG. 2
DETERMINE FIRST INFORMATION CORRESPONDING TO FIRST DCI, WHERE THE FIRST INFORMATION IS USED FOR TRANSMITTING ACK/NACK INFORMATION IN GROUPS, AND A PHYSICAL CHANNEL CORRESPONDING TO THE FIRST DCI IS ASSOCIATED WITH PRIORITY INFORMATION — 301
FIG. 3

METHOD FOR INFORMATION PROCESSING, TERMINAL DEVICE, AND NON-TRANSITORY COMPUTER-READABLE STORAGE MEDIUM

CROSS-REFERENCE TO RELATED APPLICATION(S)

This application is a continuation of International Application No. PCT/CN2020/074558, filed on Feb. 7, 2020, the entire disclosure of which is hereby incorporated by reference.

TECHNICAL FIELD

This disclosure relates to the field of communication technology, and in particular, to a method for information processing, a terminal device, and a non-transitory computer-readable storage medium.

BACKGROUND

In new radio (NR)-based access to unlicensed spectrum (NR-U), a group-based acknowledgement/negative acknowledgement (ACK/NACK) feedback manner is supported, and the feedback manner is used for transmitting ACK/NACK information in groups. Therefore, how to transmit ACK/NACK information in groups is a technical problem to be solved.

SUMMARY

A method for information processing, a terminal device, and a non-transitory computer-readable storage medium are provided in implementations of the disclosure.

In a first aspect, a method for information processing is provided in implementations of the disclosure. The method is applied to a terminal device and includes determining first information corresponding to first downlink control information (DCI), where the first information is used for transmitting acknowledgement/negative acknowledgement (ACK/NACK) information in groups, and a physical channel corresponding to the first DCI is associated with priority information.

In a second aspect, a terminal device is provided in implementations of the disclosure. The terminal device includes a processor and a memory storing computer programs. The computer programs, when executed by the processor, cause the processor to determine first information corresponding to first DCI, where the first information is used for transmitting ACK/NACK information in groups, and a physical channel corresponding to the first DCI is associated with priority information.

In a third aspect, a non-transitory computer-readable storage medium is provided in implementations of the disclosure. The computer-readable storage medium includes instructions which, when executed by a terminal device, causes the terminal device to determine first information corresponding to first DCI, where the first information is used for transmitting ACK/NACK information in groups, and a physical channel corresponding to the first DCI is associated with priority information.

BRIEF DESCRIPTION OF THE DRAWINGS

In order to describe technical solutions in implementations of the disclosure more clearly, the following will give a brief introduction to the accompanying drawings required for describing implementations. Apparently, the accompanying drawings hereinafter described are merely some implementations of the disclosure. Based on these drawings, those of ordinary skill in the art can also obtain other drawings without creative effort.

FIG. 1 is a schematic architecture diagram illustrating a communication system provided in implementations of the disclosure.

FIG. 2 is a schematic diagram illustrating regeneration of a group provided in implementations of the disclosure.

FIG. 3 is a schematic flow chart illustrating a method for information processing provided in implementations of the disclosure.

DETAILED DESCRIPTION

Figure 4:
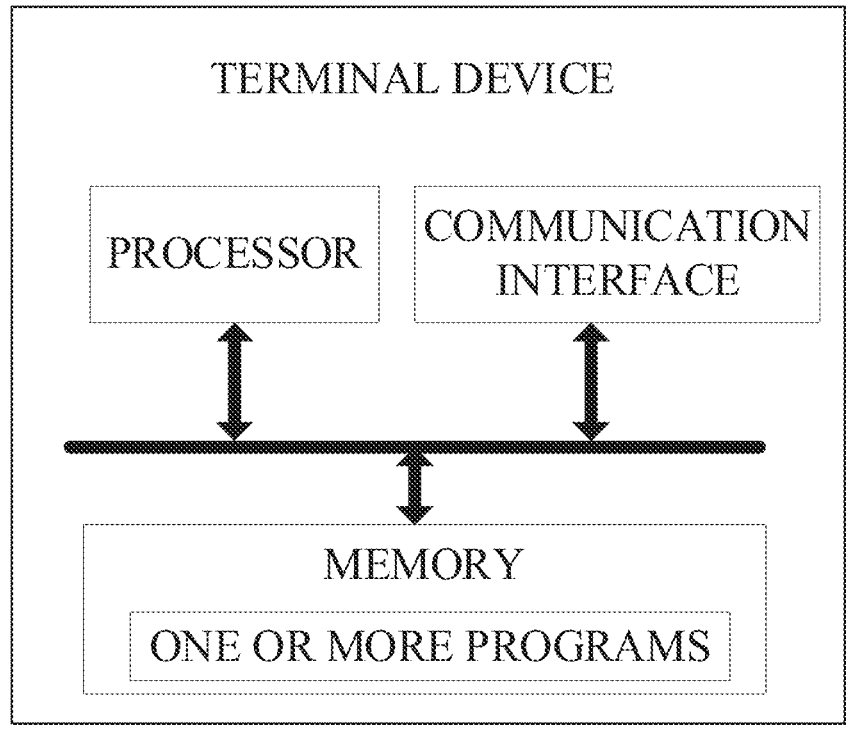
FIG. 4 is a schematic structural diagram illustrating a terminal device provided in implementations of the disclosure.

The terms used in implementations of the disclosure are only for the purpose of explaining specific implementations of the disclosure rather than limiting the disclosure. The terms "first", "second", "third", "fourth", and the like used in the specification, the claims, and the accompany drawings of the disclosure are used to distinguish different objects rather than describe a particular order. In addition, the terms "include", "comprise", and "have" as well as variations thereof are intended to cover non-exclusive inclusion.

Referring to FIG. 1, FIG. 1 is a schematic architecture diagram illustrating a communication system provided in implementations of the disclosure. The communication system includes a network device and a terminal device. As illustrated in FIG. 1, the network device can communicate with the terminal device. The communication system may be a global system of mobile communication (GSM), a code division multiple access (CDMA) system, a wideband code division multiple access (WCDMA) system, a worldwide interoperability for microwave access (WiMAX) system, a long term evolution (LTE) system, a $5^{th}$ generation (5G) communication system (e.g., new radio (NR)), a communication system integrating multiple communication technologies (e.g., a communication system integrating LTE technology and NR technology), or a subsequent evolved communication system. The forms and number of the network device and the terminal device illustrated in FIG. 1 are only for examples and do not constitute any limitation on the implementations of the disclosure.

The terminal device in the disclosure is a device with wireless communication functions, and can be deployed on land, including indoor or outdoor, handheld, wearable, or vehicle-mounted; on water (e.g., a ship); and also in the air (e.g., an aircraft, a balloon, and a satellite). The terminal device may be a mobile phone, a pad, a computer with wireless receiving and transmitting functions, a terminal device for virtual reality (VR), a terminal device for augmented reality (AR), a wireless terminal in industrial control, a wireless terminal in self driving, a wireless terminal in remote medical, a wireless terminal in smart grid, a wireless terminal in smart home, or the like. The terminal device may also be a device with wireless communication functions such as a handheld device, an in-vehicle device, a wearable device, a computer device, or other processing devices coupled with a wireless modem. The terminal device can have different names in different networks, such as a terminal device, an access terminal, a subscriber unit, a subscriber station, a mobile station, a mobile platform, a remote station, a remote terminal, a mobile device, a user terminal, a terminal, a wireless communication device, a user agent or a user apparatus, a cellular radio telephone, a cordless telephone, a session initiation protocol (SIP) telephone, a wireless local loop (WLL) station, a personal digital assistant (PDA), or a terminal device in the 5G network or a future evolved network.

The network device in the disclosure is a device deployed in the wireless access network to provide wireless communication functions. For example, the network device may be a radio access network (RAN) device at an access network side in a cellular network. The RAN device is a device for connecting the terminal device to the radio network, including but not limited to an evolved node b (eNB), a radio network controller (RNC), a node b (NB), a base station controller (BSC), a base transceiver station (BTS), a home base station (e.g., a home evolved node b, home node b, or HNB), a base band unit (BBU), a mobility management entity (MME). For another example, the network device may also be a node device in a wireless local area network (WLAN), e.g., an access controller (AC), a gateway, or a wireless fidelity (WiFi) access point (AP). For yet another example, the network device may also be a transmission node or a transmission reception point (TRP or TP) in an NR system.

The unlicensed spectrum is a spectrum that is divided according to nations and regions and is available for communication of radio devices. Generally, the spectrum is regarded as a shared spectrum, i.e., communication devices in different communication systems can use the spectrum and may not to apply for an exclusive spectrum license from government as long as these communication devices satisfy regulatory requirements on the spectrum set by the nations or regions. In order to make all communication systems that use the unlicensed spectrum for wireless communication coexist in the spectrum in a friendly way, some nations or regions stipulate regulatory requirements that must be satisfied when the unlicensed spectrum is used. For example, in some regions, communication devices follow a principle of "listen before talk (LBT)". That is, before a communication device performs signal transmission on a channel in the unlicensed spectrum, the communication device may listen to the channel. If a listen result of the channel is that the channel is vacant, the communication device can perform signal transmission. If the listen result of the channel in the unlicensed spectrum is that the channel is occupied, the communication device cannot perform signal transmission. In order to ensure fairness, in a transmission, a duration for the communication device to use the channel in the unlicensed spectrum for signal transmission cannot exceed a maximum channel occupancy time (MCOT). With development of wireless communication technology, the LTE system and the NR system may consider deploying the network in the unlicensed spectrum, to use the unlicensed spectrum for data service transmission.

In NR-based access to unlicensed spectrum (NR-U) in release 16 (Rel-16), a group-based acknowledgement/negative acknowledgement (ACK/NACK) feedback manner is supported, and at most two downlink (DL) channel groups are indicated currently. The network device indicates, through downlink control information (DCI), group information which a physical downlink shared channel (PDSCH) scheduled by the DCI belongs to, or group information which a physical downlink control channel (PDCCH) carrying the DCI belongs to. When the network device transmits triggering signaling to indicate the terminal device to feed back ACK/NACK information corresponding to a certain group, the terminal device feeds back to the network device ACK/NACK information corresponding to all PDSCHs or PDCCHs belonging to the group. The network device can trigger multiple times the terminal device to transmit ACK/NACK information corresponding to a certain group, that is, implement ACK/NACK retransmission.

A $3^{rd}$ generation partnership project (3GPP) determines that DCI with a DCI format 1_1 includes the following.

(1) A PDSCH group index information field indicates group information which a DL physical channel corresponding to the DCI belongs to, specifically, explicitly indicates group 0 or group 1.

(2) A new feedback indicator (NFI) information field indicates regeneration of group information which a PDSCH scheduled by the DCI belongs to. Specifically, as illustrated in FIG. 2, after successful feedback of ACK/NACK information corresponding to group 0 corresponding to three DCI with NFI=0 (a downlink assignment index (DAI) indicates index information of current DCI in the group) through a physical uplink control channel (PUCCH), the network device can set the NFI to 1 (a work manner of bit flipping) during subsequent scheduling of group 0, representing reorganization of group 0, that is, previous ACK/NACK information corresponding to NFI=0 is released.

(3) An information field of number of requested PDSCH groups indicates group information corresponding to a DL physical channel triggered by the DCI for feedback. A bit value of the information field being "0" represents triggering of transmission of feedback information corresponding to a channel group where a DL physical channel corresponding to the current DCI is located. The bit value of the information field being "1" represents triggering of transmission of feedback information corresponding to two channel groups.

DCI with a DCI format 1_0 includes no three information fields above. A DL physical channel corresponding to the DCI is agreed to belong to group 0. The DCI only can trigger the terminal device to transmit feedback information corresponding to group 0. The DCI does not support regeneration of group 0.

Various types of services are supported in the 5G NR, e.g., enhanced mobile broadband (eMBB), ultra-reliable low latency (URLLC), or the like. For the eMBB service, data volume is great, a transmission rate is high, and the eMBB service is usually transmitted through a relatively long time-domain scheduling unit, and is insensitive to latency. For the URLLC service, data packet generation is sudden and random, and a latency requirement is high.

In NR Rel-16, a 2-level priority is supported for uplink (UL) information in URLLC. Only UL information with a same priority can be multiplexed for transmission. When a high-priority UL channel overlaps a low-priority UL channel, the low-priority channel is abandoned. DCI includes a priority indicator information field indicating priority information of a physical channel corresponding to the DCI. In a case that some DCI includes no priority indicator information field, priority information of a physical channel can be configured via higher-layer signaling, or agreed according to a protocol (currently, agreed to be a low priority).

For URLLC in NR Rel-16, in order to improve reliability of DCI, a compressed DCI format is supported, i.e., a DCI format 1_2 is supported. For DCI with the DCI format 1_2, the number of bits is relatively small, and presence or absence of various information fields and the number of bits are configured by higher-layer signaling. In Rel-17, if the URLLC service is supported on an NR-U carrier, supposing that existing DCI with the DCI format 1_2 is used for scheduling, a group-based ACK/NACK feedback manner for ACK/NACK information transmission is unable to be supported, thereby resulting in a loss of ACK/NACK information performance and resulting in that URLLC performance requirements cannot be satisfied. If it is required to support the group-based ACK/NACK feedback manner, DCI with the DCI format 1_1 is required to be used, but overhead of the DCI is relatively great, and thus reliability of DCI transmission may be reduced and URLLC performance requirements cannot be satisfied. Therefore, how to combine the DCI with the DCI format 1_2 with the group-based ACK/NACK feedback manner for use is a technical problem to be solved.

Referring to FIG. 3, FIG. 3 is a schematic flow chart illustrating a method for information processing provided in implementations of the disclosure. The method includes the following.

At 301, a terminal device determines first information corresponding to first DCI, where the first information is used for transmitting ACK/NACK information in groups, and a physical channel corresponding to the first DCI is associated with priority information.

In an implementation of the disclosure, the first information includes at least one of: group information corresponding to the physical channel corresponding to the first DCI, new feedback information corresponding to the first DCI, or triggering feedback group information corresponding to the first DCI.

The group information corresponding to the physical channel corresponding to the first DCI refers to group information of a physical channel group which the physical channel corresponding to the first DCI belongs to.

The new feedback information is used for indicating whether to regenerate a channel group. The new feedback information corresponding to the first DCI is determined according to the first DCI.

The triggering feedback group information is group information of a group which corresponding ACK/NACK information is triggered for transmission. The triggering feedback group information corresponding to the first DCI is determined according to the first DCI.

The first DCI has a format of a DCI format 1_2.

An information field in the first DCI has a bit length indicated by a network device, e.g., indicated by the network device via higher-layer signaling (e.g., radio resource control (RRC) signaling, or the like), dedicated signaling, or the like.

For example, the first DCI includes a PDSCH group index information field, and the network device indicates that a bit length of the information field is 0, 1, or other values. For another example, the first DCI includes an NFI information field, and the network device indicates that a bit length of the information field is 0, 1, 2, 4, or other values. For yet another example, the first DCI includes an information field of number of requested PDSCH groups, and the network device indicates that a bit length of the information field is 0, 1, 2, or other values.

Optionally, the method further includes receiving configuration information by the terminal device, where the configuration information indicates that the terminal device adopts a group-based ACK/NACK feedback manner.

In an implementation of the disclosure, the physical channel corresponding to the first DCI includes a PDSCH scheduled by the first DCI or a PDCCH carrying the first DCI.

In an implementation of the disclosure, the transmitting ACK/NACK information in groups includes multiplexing and transmitting ACK/NACK information corresponding to physical channels in a target group through an uplink channel, where the target group is a group which corresponding ACK/NACK information is triggered for transmission.

Alternatively, the transmitting ACK/NACK in groups includes performing ACK/NACK information transmission in the group-based ACK/NACK feedback manner.

In an implementation of the disclosure, the PDSCH group index information field in the first DCI has a bit length of 0, and the group information is determined according to the priority information associated with the physical channel corresponding to the first DCI.

The priority information associated with the physical channel corresponding to the first DCI is determined according to one of: an indication of a priority indicator information field in the first DCI, an indication of higher-layer signaling, or a protocol.

The bit length of the PDSCH group index information field in the first DCI being 0 indicates that the first DCI includes no PDSCH group index information field.

For example, the group information corresponding to the physical channel corresponding to the first DCI is group 0 supposing that the priority information associated with the physical channel corresponding to the first DCI is 0. The group information corresponding to the physical channel corresponding to the first DCI is group 1 supposing that the priority information associated with the physical channel corresponding to the first DCI is 1. The group information corresponding to the physical channel corresponding to the first DCI is group 0 supposing that the priority information associated with the physical channel corresponding to the first DCI is 1. The group information corresponding to the physical channel corresponding to the first DCI is group 1 supposing that the priority information associated with the physical channel corresponding to the first DCI is 0.

In an implementation of the disclosure, the bit length of the PDSCH group index information field in the first DCI is 0, and the group information is the same as or different from group information of a physical channel group corresponding to second DCI, where a format of the second DCI is a DCI format 1_0.

Specifically, since the group information of the physical channel group corresponding to the second DCI is agreed to be group 0, on condition that the group information corresponding to the physical channel corresponding to the first DCI is the same as the group information of the physical channel group corresponding to the second DCI, the group information corresponding to the physical channel corresponding to the first DCI is group 0. Since at most two groups (group 0 and group 1) are supported currently, on condition that the group information corresponding to the physical channel corresponding to the first DCI is different from the group information of the physical channel group corresponding to the second DCI, the group information corresponding to the physical channel corresponding to the first DCI is group 1.

In an implementation of the disclosure, the bit length of the PDSCH group index information field in the first DCI is 0, and the group information is determined according to a transmission resource for the first DCI.

Optionally, the transmission resource for the first DCI includes a search space carrying the first DCI or a control channel element (CCE) carrying the first DCI.

The search space includes a common search space, a terminal device-specific search space, or the like.

Optionally, the network device configures a second correspondence, where the second correspondence is a correspondence between search spaces and group information.

For example, the common search space is configured to correspond to group 0, and the terminal device-specific search space is configured to correspond to group 1. If the search space carrying the first DCI is a common search space, the group information corresponding to the physical channel corresponding to the first DCI is also group 0. If the search space carrying the first DCI is a terminal device-specific search space, the group information corresponding to the physical channel corresponding to the first DCI is also group 1.

For another example, the common search space is configured to correspond to group 1, and the terminal device-specific search space is configured to correspond to group 0. If the search space carrying the first DCI is a common search space, the group information corresponding to the physical channel corresponding to the first DCI is also group 1. If the search space carrying the first DCI is a terminal device-specific search space, the group information corresponding to the physical channel corresponding to the first DCI is also group 0.

In an implementation of the disclosure, the bit length of the PDSCH group index information field in the first DCI is 0, and the group information is agreed.

The group information is agreed as follows. The group information is agreed according to a protocol. Alternatively, the group information is pre-agreed by the network device or the terminal device. For example, the group information is agreed to be group 0 or group 1.

In an implementation of the disclosure, the bit length of the PDSCH group index information field in the first DCI is 0, and the group information is configured by the network device.

Specifically, the network device can configure the group information via higher-layer signaling or other signaling, e.g., configure the group information to be group 0 or group 1.

In an implementation of the disclosure, the group information is determined according to a first information field in the first DCI.

Furthermore, the bit length of the PDSCH group index information field in the first DCI is a positive integer.

Optionally, the first information field is the PDSCH group index information field, or the first information field is the priority indicator information field.

In an implementation of the disclosure, the group information is determined according to an indication result of the first information field.

Optionally, priorities of physical channels in a same group are the same on condition that the group information is determined according to the indication result of the first information field.

Specifically, the terminal device maintains two groups, and if priorities of physical channels in a same group are the same, the terminal device can determine the group information according to any of the PDSCH group index information field or the priority indicator information field. For example, the group information corresponding to the physical channel corresponding to the first DCI is group 0 supposing that the indication result of the PDSCH group index information field is 0, and the group information corresponding to the physical channel corresponding to the first DCI is group 1 supposing that the indication result of the PDSCH group index information field is 1. For another example, the group information corresponding to the physical channel corresponding to the first DCI is group 0 supposing that the indication result of the priority indicator information field is 0, and the group information corresponding to the physical channel corresponding to the first DCI is group 1 supposing that the indication result of the priority indicator information field is 1.

In addition, the terminal device maintains two groups, and if priorities of physical channels in a same group are different, the terminal device can determine the group information according to the PDSCH group index information field.

In an implementation of the disclosure, the group information is determined according to the indication result of the first information field and the priority information associated with the physical channel corresponding to the first DCI.

Specifically, the terminal device maintains four groups. The terminal device determines the group information corresponding to the physical channel corresponding to the first DCI according to the indication result of the PDSCH group index information field and the priority information associated with the physical channel corresponding to the first DCI. For example, supposing that the indication result of the PDSCH group index information field is 0 and the priority information associated with the physical channel corresponding to the first DCI is 0, the group information corresponding to the physical channel corresponding to the first DCI is group 0 with a priority of 0. For another example, supposing that the indication result of the PDSCH group index information field is 0 and the priority information associated with the physical channel corresponding to the first DCI is 1, the group information corresponding to the physical channel corresponding to the first DCI is group 1 with a priority of 0. For yet another example, supposing that the indication result of the PDSCH group index information field is 1 and the priority information associated with the physical channel corresponding to the first DCI is 0, the group information corresponding to the physical channel corresponding to the first DCI is group 0 with a priority of 1. For yet another example, supposing that the indication result of the PDSCH group index information field is 1 and the priority information associated with the physical channel corresponding to the first DCI is 1, the group information corresponding to the physical channel corresponding to the first DCI is group 1 with a priority of 1.

In an implementation of the disclosure, a second information field in the first DCI has a bit length of 0, and the new feedback information indicates that a group corresponding to the first DCI is not re-generated or all groups supported by the terminal device are not re-generated.

The bit length of the second information field in the first DCI being 0 represents that the first DCI includes no second information field.

In an implementation of the disclosure, the new feedback information is determined according to the second information field in the first DCI, the bit length of the second information field in the first DCI is 1, and 1 bit of the second information field indicates whether the group corresponding to the first DCI is re-generated.

For example, a value of the 1 bit of the second information field being 0 indicates that the group corresponding to the first DCI is not re-generated, and the value of the 1 bit of the second information field being 1 indicates that the group corresponding to the first DCI is re-generated. For another example, the value of the 1 bit of the second information field being 1 indicates that the group corresponding to the first DCI is not re-generated, and the value of the 1 bit of the second information field being 0 indicates that the group corresponding to the first DCI is re-generated.

In an implementation of the disclosure, the new feedback information is determined according to the second information field in the first DCI, the bit length of the second information field is N, and N is a positive integer. N bits of the second information field respectively indicate whether N groups with the same priority as the physical channel corresponding to the first DCI are re-generated. Alternatively, the N bits of the second information field respectively indicate whether N groups with a highest priority are re-generated. Alternatively, the N bits of the second information field respectively indicate whether N groups with a lowest priority are re-generated. Alternatively, the N bits of the second information field respectively indicate whether N groups with different priorities or supported by the terminal device are re-generated. The N bits are in one-to-one correspondence with the N groups.

For example, supposing that N=2, one bit corresponds to one group, e.g., a first bit corresponds to group 0 with the same priority as the physical channel corresponding to the first DCI, and a second bit corresponds to group 1 with the same priority as the physical channel corresponding to the first DCI. If a value of the second information field is 00, it indicates that two groups with the same priority as the physical channel corresponding to the first DCI are not re-generated. If the value of the second information field is 11, it indicates that the two groups with the same priority as the physical channel corresponding to the first DCI are re-generated. If the value of the second information field is 01, it indicates that group 0 with the same priority as the physical channel corresponding to the first DCI is not re-generated and group 1 with the same priority as the physical channel corresponding to the first DCI is re-generated. If the value of the second information field is 10, it indicates that group 0 with the same priority as the physical channel corresponding to the first DCI is re-generated and group 1 with the same priority as the physical channel corresponding to the first DCI is not re-generated.

For another example, supposing that N=2, one bit corresponds to one group, e.g., a first bit corresponds to group 0 with a highest priority, and a second bit corresponds to group 1 with a highest priority. If the value of the second information field is 00, it indicates that two groups with the highest priority are not re-generated. If the value of the second information field is 11, it indicates that the two groups with the highest priority are re-generated. If the value of the second information field is 01, it indicates that group 0 with the highest priority is not re-generated and group 1 with the highest priority is re-generated. If the value of the second information field is 10, it indicates that group 0 with the highest priority is re-generated and group 1 with the highest priority is not re-generated.

For yet example, supposing that N=4, one bit corresponds to one group, e.g., a first bit corresponds to group 0 with a priority of 0, a second bit corresponds to group 1 with a priority of 0, a third bit corresponds to group 0 with a priority of 1, and a fourth bit corresponds to group 1 with a priority of 1. If the value of the second information field is 0000, it indicates that four groups are not re-generated. If the value of the second information field is 1111, it indicates that the four groups are re-generated. If the value of the second information field is 1100, it indicates that group 0 with the priority of 0 and group 1 with the priority of 0 are re-generated and group 0 with the priority of 1 and group 1 with the priority of 1 are not re-generated. If the value of the second information field is 0011, it indicates that group 0 with the priority of 0 and group 1 with the priority of 0 are not re-generated and group 0 with the priority of 1 and group 1 with the priority of 1 are re-generated, and so on.

In an implementation of the disclosure, the second information field is the NFI information field.

In an implementation of the disclosure, a third information field in the first DCI has a bit length of 0, and the triggering feedback group information is the group information corresponding to the physical channel corresponding to the first DCI.

The bit length of the third information field in the first DCI being 0 represents that the first DCI includes no third information field.

In an implementation of the disclosure, the triggering feedback group information is determined according to the third information field in the first DCI, and the bit length of the third information field is 1. The third information field indicates transmission of feedback information corresponding to all groups, the third information field indicates transmission of feedback information corresponding to a group with the same priority as the physical channel corresponding to the first DCI, the third information field indicates transmission of feedback information corresponding to a group with a highest priority, or the third information field indicates transmission of feedback information corresponding to a group with a lowest priority.

In an implementation of the disclosure, the triggering feedback group information is determined according to the first correspondence and a fourth information field in the first DCI, where a bit length of the fourth information field is a positive integer, and the first correspondence is a correspondence between indication results of an information field and group information.

The first correspondence is agreed according to a protocol, or configured by the network device (e.g., configured via higher-layer signaling).

For example, supposing that the bit length of the fourth information field is 2, the first correspondence is illustrated in Table 1.

TABLE 1

| indication result of an information field | group information |
|---|---|
| 00 | group information corresponding to DCI |
| 01 | group information of two groups with the same priority as DCI |
| 10 | group information of two groups with the same priority as DCI and group information of a group with a priority different from DCI |
| 11 | group information of all groups |

In an implementation of the disclosure, the third information field or the fourth information field is the information field of number of requested PDSCH groups.

As can be seen that, in implementations of the disclosure, it is realized that the group-based ACK/NACK feedback manner is supported by using the DCI with the DCI format 1_2, and it is also realized that overhead of the DCI is configured according to actual needs, ensuring a transmission performance of ACK/NACK information and reasonably controlling overhead of the DCI.

Referring to FIG. 4, FIG. 4 is a schematic structural diagram illustrating a terminal device provided in implementations of the disclosure. The terminal device includes one or more processors, one or more memories, one or more communication interfaces, and one or more programs, where the one or more programs are stored in the one or more memories and are configured to be performed by the one or more processors, and the one or more programs include instructions used for performing the following operations.

Determine first information corresponding to first DCI, where the first information is used for transmitting ACK/NACK information in groups, and a physical channel corresponding to the first DCI is associated with priority information.

In an implementation of the disclosure, the first information includes at least one of: group information corresponding to the physical channel corresponding to the first DCI, new feedback information corresponding to the first DCI, or triggering feedback group information corresponding to the first DCI.

In an implementation of the disclosure, the group information is determined according to the priority information associated with the physical channel corresponding to the first DCI, where the priority information is determined according to one of: an indication of a priority indicator information field in the first DCI, an indication of higher-layer signaling, or a protocol. The group information is the same as or different from group information of a physical channel group corresponding to second DCI, where a format of the second DCI is a DCI format 1_0. The group information is determined according to a transmission resource for the first DCI, the group information is agreed, or the group information is configured by a network device.

Optionally, the transmission resource for the first DCI includes a search space carrying the first DCI or a CCE carrying the first DCI.

Optionally, a PDSCH group index information field in the first DCI has a bit length of 0.

In an implementation of the disclosure, the group information is determined according to a first information field in the first DCI.

Optionally, the group information is determined according to an indication result of the first information field, or the group information is determined according to the indication result of the first information field and the priority information associated with the physical channel corresponding to the first DCI.

Optionally, priorities of physical channels in a same group are the same on condition that the group information is determined according to the indication result of the first information field.

Optionally, the first information field is the PDSCH group index information field, or the first information field is the priority indicator information field.

In an implementation of the disclosure, the new feedback information is determined according to a second information field in the first DCI, the second information field has a bit length of N, and N is a positive integer. N bits of the second information field respectively indicate whether N groups with the same priority as the physical channel corresponding to the first DCI are re-generated. Alternatively, the N bits of the second information field respectively indicate whether N groups with a highest priority are re-generated. Alternatively, the N bits of the second information field respectively indicate whether N groups with a lowest priority are re-generated. Alternatively, the N bits of the second information field respectively indicate whether N groups with different priorities or supported by the terminal device are re-generated. The N bits are in one-to-one correspondence with the N groups.

Optionally, the second information field is an NFI information field.

In an implementation of the disclosure, the triggering feedback group information is determined according to a third information field in the first DCI, and the third information field has a bit length of 1. The third information field indicates transmission of feedback information corresponding to all groups, the third information field indicates transmission of feedback information corresponding to a group with the same priority as the physical channel corresponding to the first DCI, the third information field indicates transmission of feedback information corresponding to a group with a highest priority, or the third information field indicates transmission of feedback information corresponding to a group with a lowest priority.

In an implementation of the disclosure, the triggering feedback group information is determined according to a first correspondence and a fourth information field in the first DCI, where the first correspondence is a correspondence between indication results of an information field and group information.

In an implementation of the disclosure, the third information field or the fourth information field is an information field of number of requested PDSCH groups.

In an implementation of the disclosure, the physical channel corresponding to the first DCI includes a PDSCH scheduled by the first DCI. Alternatively, the physical channel corresponding to the first DCI includes a PDCCH carrying the first DCI.

In an implementation of the disclosure, the transmitting ACK/NACK information in groups includes multiplexing and transmitting ACK/NACK information corresponding to physical channels in a target group through an uplink channel, where the target group is a group which corresponding ACK/NACK information is triggered for transmission.

It is to be noted that, for the specific implementation process of the implementation, reference can be made to the specific implementation process in the above method implementations, which will not be repeated herein.

Figure 5:
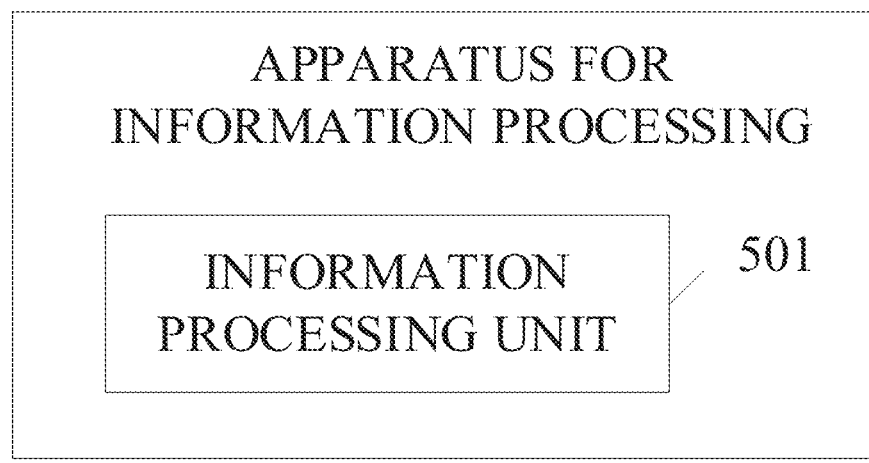
FIG. 5 is a schematic structural diagram illustrating an apparatus for information processing provided in implementations of the disclosure.

Referring to FIG. 5, FIG. 5 is a schematic structural diagram illustrating an apparatus for information processing provided in implementations of the disclosure. The apparatus is applied to a terminal device and includes an information processing unit 501.

The information processing unit 501 is configured to determine first information corresponding to first DCI, where the first information is used for transmitting ACK/NACK information in groups, and a physical channel corresponding to the first DCI is associated with priority information.

In an implementation of the disclosure, the first information includes at least one of: group information corresponding to the physical channel corresponding to the first DCI, new feedback information corresponding to the first DCI, or triggering feedback group information corresponding to the first DCI.

In an implementation of the disclosure, the group information is determined according to the priority information associated with the physical channel corresponding to the first DCI, where the priority information is determined according to one of: an indication of a priority indicator information field in the first DCI, an indication of higher-layer signaling, or a protocol. The group information is the same as or different from group information of a physical channel group corresponding to second DCI, where a format of the second DCI is a DCI format 1_0. The group information is determined according to a transmission resource for the first DCI, the group information is agreed, or the group information is configured by a network device.

Optionally, the transmission resource for the first DCI includes a search space carrying the first DCI or a CCE carrying the first DCI.

Optionally, a PDSCH group index information field in the first DCI has a bit length of 0.

In an implementation of the disclosure, the group information is determined according to a first information field in the first DCI.

Optionally, the group information is determined according to an indication result of the first information field, or the group information is determined according to the indication result of the first information field and the priority information associated with the physical channel corresponding to the first DCI.

Optionally, priorities of physical channels in a same group are the same on condition that the group information is determined according to the indication result of the first information field.

Optionally, the first information field is the PDSCH group index information field, or the first information field is the priority indicator information field.

In an implementation of the disclosure, the new feedback information is determined according to a second information field in the first DCI, the second information field has a bit length of N, and N is a positive integer. N bits of the second information field respectively indicate whether N groups with the same priority as the physical channel corresponding to the first DCI are re-generated. Alternatively, the N bits of the second information field respectively indicate whether N groups with a highest priority are re-generated. Alternatively, the N bits of the second information field respectively indicate whether N groups with a lowest priority are re-generated. Alternatively, the N bits of the second information field respectively indicate whether N groups with different priorities or supported by the terminal device are re-generated. The N bits are in one-to-one correspondence with the N groups.

Optionally, the second information field is an NFI information field.

In an implementation of the disclosure, the triggering feedback group information is determined according to a third information field in the first DCI, and the third information field has a bit length of 1. The third information field indicates transmission of feedback information corresponding to all groups, the third information field indicates transmission of feedback information corresponding to a group with the same priority as the physical channel corresponding to the first DCI, the third information field indicates transmission of feedback information corresponding to a group with a highest priority, or the third information field indicates transmission of feedback information corresponding to a group with a lowest priority.

In an implementation of the disclosure, the triggering feedback group information is determined according to a first correspondence and a fourth information field in the first DCI, where the first correspondence is a correspondence between indication results of an information field and group information.

In an implementation of the disclosure, the third information field or the fourth information field is an information field of number of requested PDSCH groups.

In an implementation of the disclosure, the physical channel corresponding to the first DCI includes a PDSCH scheduled by the first DCI. Alternatively, the physical channel corresponding to the first DCI includes a PDCCH carrying the first DCI.

In an implementation of the disclosure, the transmitting ACK/NACK information in groups includes multiplexing and transmitting ACK/NACK information corresponding to physical channels in a target group through an uplink channel, where the target group is a group which corresponding ACK/NACK information is triggered for transmission.

It needs to be noted that, the information processing unit 501 can be implemented through a processor.

A computer storage medium is further provided in implementations of the disclosure. The computer storage medium is configured to store a computer program used for performing electronic data interchange, where the computer program enables a computer to execute any of the methods illustrated in the above-mentioned method implementations. The above computer includes a terminal device or a network device.

A computer program product is further provided in implementations of the disclosure. The computer program product includes computer program instructions which enable a computer to execute any of the methods illustrated in the above-mentioned method implementations. The computer program product may be a software installation package. The above computer includes a terminal device or a network device.

A chip is further provided in implementations of the disclosure. The chip includes computer program instructions which enable a computer to execute any of the methods illustrated in the above-mentioned method implementations. The above computer includes a user equipment.

A computer program is further provided in implementations of the disclosure. The computer program can enable a computer to execute any of the methods illustrated in the above-mentioned method implementations. The above computer includes a user equipment.

It to be noted that, for the sake of simplicity, the foregoing method implementations are described as a series of action combinations. However, it will be appreciated by those skilled in the art that the disclosure is not limited by the sequence of actions described. According to the disclosure, some steps or operations may be performed in other orders or simultaneously. Besides, it will be appreciated by those skilled in the art that the implementations described in the specification are exemplary implementations, and the actions and modules involved are not necessarily essential to the disclosure.

In the foregoing implementations, the description of each implementation has its own emphasis. For the parts not described in detail in a certain implementation, reference may be made to related descriptions in other implementations.

In implementations provided in the disclosure, it will be appreciated that the apparatuses disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, apparatuses, or units, and may be electrical, or otherwise.

The units illustrated as separated components may or may not be physically separated. Components or parts displayed as units may or may not be physical units, and may reside at one location or may be distributed to multiple network units. Some or all of the units may be selectively adopted according to practical needs to achieve desired objectives of the solution in the implementations.

In addition, various functional units described in various implementations of the disclosure may be integrated into one processing unit or may be present as a number of physically separated units, and two or more units may be integrated into one unit. The integrated unit may be implemented by taking the form of hardware or a software functional unit.

If the integrated units above are implemented as software functional units and sold or used as standalone products, they may be stored in a computer readable storage medium. Based on such an understanding, the technical solution of the disclosure in essence, or the portion that contributes to the prior art, or all or part of the technical solution may be embodied as software products. The computer software products can be stored in a memory and may include multiple instructions that, when executed, can cause a computer device (e.g., a personal computer, a server, a network device, etc.,) to execute all or part of the operations of the methods described in various implementations of the disclosure. The above memory may include various kinds of media that can store program codes, such as a universal serial bus (USB) flash disk, a read-only memory (ROM), a random access memory (RAM), a mobile hard drive, a magnetic disk, or an optical disk.

It will be understood by those of ordinary skill in the art that all or a part of the various methods of the implementations described above may be accomplished by means of a program to instruct associated hardware, and the program may be stored in a computer-readable memory, which may include a flash disk, an ROM, an RAM, a magnetic disk, or an optical disk.

The above implementations in the disclosure are described in detail. Principles and implementation manners of the disclosure are elaborated with specific implementations herein. The illustration of implementations above is only used to help understanding of methods and core ideas of the present disclosure. At the same time, for those of ordinary skill in the art, according to ideas of the present disclosure, there will be changes in the specific implementation manners and application scopes. In summary, contents of this specification should not be understood as limitation on the present disclosure.

What is claimed is:

1. A method for information processing, the method being executed by a terminal device and comprising:
   determining first information corresponding to first downlink control information (DCI), the first information being used for transmitting acknowledgement/negative acknowledgement (ACK/NACK) information in groups, and a physical channel corresponding to the first DCI being associated with priority information; wherein
   the triggering feedback group information is determined according to a third information field in the first DCI, and the third information field has a bit length of 1, wherein the third information field indicates transmission of feedback information corresponding to all groups; or
   the triggering feedback group information is determined according to a first correspondence and a fourth information field in the first DCI, wherein the first correspondence is a correspondence between indication results of an information field and group information.

2. The method of claim 1, wherein the first information comprises triggering feedback group information.

3. The method of claim 1, wherein
   the physical channel corresponding to the first DCI comprises a physical downlink shared channel (PDSCH) scheduled by the first DCI.

4. The method of claim 1, wherein the transmitting ACK/NACK information in groups comprises:
   multiplexing and transmitting ACK/NACK information corresponding to physical channels in a target group through an uplink channel, wherein the target group is a group which corresponding ACK/NACK information is triggered for transmission.

5. The method of claim 1, wherein the physical channel corresponding to the first DCI being associated with priority information comprises:
   physical channels in a physical channel group corresponding to the first DCI being associated with different priorities, and the physical channel group corresponding to the first DCI being indicated by a first information field in the DCI.

6. A terminal device comprising:
   a processor; and
   a memory storing computer programs which, when executed by the processor, cause the processor to;
   determine first information corresponding to first downlink control information (DCI), the first information being used for transmitting acknowledgement/negative acknowledgement (ACK/NACK) information in groups, and a physical channel corresponding to the first DCI being associated with priority information; wherein
   the triggering feedback group information is determined according to a third information field in the first DCI, and the third information field has a bit length of 1, wherein the third information field indicates transmission of feedback information corresponding to all groups; or
   the triggering feedback group information is determined according to a first correspondence and a fourth information field in the first DCI, wherein the first correspondence is a correspondence between indication results of an information field and group information.

7. The terminal device of claim 6, wherein the first information comprises triggering feedback group information.

8. The terminal device of claim 6, wherein
   the physical channel corresponding to the first DCI comprises a physical downlink shared channel (PDSCH) scheduled by the first DCI.

9. The terminal device of claim 6, wherein the transmitting ACK/NACK information in groups comprises:
   multiplexing and transmitting ACK/NACK information corresponding to physical channels in a target group through an uplink channel, wherein the target group is a group which corresponding ACK/NACK information is triggered for transmission.

10. The terminal device of claim 6, wherein the physical channel corresponding to the first DCI being associated with priority information comprises:
physical channels in a physical channel group corresponding to the first DCI being associated with different priorities, and the physical channel group corresponding to the first DCI being indicated by a first information field in the DCI.

11. A non-transitory computer-readable storage medium comprising instructions which, when executed by a terminal device, cause the terminal device to:
determine first information corresponding to first DCI, wherein the first information is used for transmitting ACK/NACK information in groups, and a physical channel corresponding to the first DCI is associated with priority information; wherein
the triggering feedback group information is determined according to a third information field in the first DCI, and the third information field has a bit length of 1, wherein the third information field indicates transmission of feedback information corresponding to all groups; or
the triggering feedback group information is determined according to a first correspondence and a fourth information field in the first DCI, wherein the first correspondence is a correspondence between indication results of an information field and group information.

12. The non-transitory computer-readable storage medium of claim 11, wherein the first information comprises triggering feedback group information.

13. The non-transitory computer-readable storage medium of claim 11, wherein the physical channel corresponding to the first DCI comprises a physical downlink shared channel (PDSCH) scheduled by the first DCI.

14. The non-transitory computer-readable storage medium of claim 11, wherein the transmitting ACK/NACK information in groups comprises:
multiplexing and transmitting ACK/NACK information corresponding to physical channels in a target group through an uplink channel, wherein the target group is a group which corresponding ACK/NACK information is triggered for transmission.

15. The non-transitory computer-readable storage medium of claim 11, wherein the physical channel corresponding to the first DCI being associated with priority information comprises:
physical channels in a physical channel group corresponding to the first DCI being associated with different priorities, and the physical channel group corresponding to the first DCI being indicated by a first information field in the DCI.

* * * * *